United States Patent Office 3,663,476
Patented May 16, 1972

3,663,476
ALKALINE STRIPPING COMPOSITION AND PROCESS
Donald P. Murphy, Roseville, Mich., assignor to Hooker Chemical Corporation, Niagara Falls, N.Y.
No Drawing. Filed Mar. 20, 1969, Ser. No. 809,011
Int. Cl. C11d 7/16, 7/32
U.S. Cl. 252—529           4 Claims

ABSTRACT OF THE DISCLOSURE

An aqueous alkaline stripping solution which contains an accelerator composition comprised of an alkylene glycol aryl ether, tripropylene glycol or dipropylene glycol, and an organic nitrogen compound of the formula:

wherein $R_1$, $R_2$ and $R_3$ are independently selected from the group consisting of hydrogen, alkanol and hydroxy ether groups wherein the hydroxy group is terminal, which latter groups contain from about 2 to 10 carbon atoms, at least 1 of $R_1$, $R_2$ and $R_3$ being other than hydrogen, the compound having a boiling point of at least about 100 degrees C. and a molecular weight which is not substantially in excess of about 500. The preferred components of the activator composition are ethylene glycol monophenyl ether, tripropylene glycol and triethanolamine.

---

This invention relates to a composition and method for removing protective coatings from substrates to which they have been applied and more particularly it relates to an improved accelerator additive for increasing the effectiveness of an alkaline stripping composition for the removal of latex residues from the walls of polymerization vessels.

In the manufacture of natural and synthetic rubber latex compositions, problems have risen in connection with the cleaning of the glass lined or stainless steel reaction vessels or polymerizers. After a batch of the latex composition has been made and removed from the polymerizer, the small amounts of the latex which still adheres to the side walls and in corners and in crevices dries and forms solid rubber lumps. Eventually, the solid latex lumps increase in size to the point where they must be removed if efficient operation of the polymerizers is to continue. Because of the difficulty in finding a chemical composition which will effectively attack the latex lumps without attacking the glass lining of the polymerization vessel, the removal of these latex buildups has generally been done by hand scraping or cutting.

In a copending application Ser. No. 764,292, filed Oct. 1, 1968, there is disclosed an accelerator for an aqueous stripping solution which is comprised of tripropylene glycol and a mono-, di-, or tri-, alkanol or hydroxy ether amine. Although the aqueous alkaline stripping solutions containing this accelerator will remove the accumulated latex deposits from the glass polymerizer without attack of the glass lining, the rate at which this removal is attained is undesirably long, frequently requiring periods in excess of one hour. In a second copending application, Ser. No. 764,291, filed Oct. 1, 1968, there is disclosed an accelerator composition for an alkaline stripping solution which is comprised of an alkylene glycol aryl ether and a mono-, di-, or tri-alkanol or hydroxy ether amine. Although the alkaline stripping solutions containing this accelerator are quite effective and will remove the accumulated latex deposits in an appreciably shorter period of time than will stripping solutions accelerated with the former compositions, the latex deposits after stripping are in the form of a sticky, gummy mass which is very difficult to handle. Thus, although the use of both of these compositions give improved results when compared to other known removal methods, neither provides the complete solution to this problem.

It is, therefore, an object of the present invention to provide an improved alkaline stripping composition which is effective in removing natural and synthetic rubber latex deposits from surfaces to which they have been applied.

Another object of the present invention is to provide an improved method for removing natural and synthetic rubber latex deposits from surfaces to which they have been applied, and particularly from the glass linings of polymerization vessels.

These and other objects will become apparent to those skilled in the art from the description of the invention which follows.

Pursuant to the above objects, the present invention includes a concentrate composition, useful when admixed with water in forming an aqueous alkaline paint stripping composition, which concentrate comprises an alkaline material and an accelerating amount of an accelerator composition comprising an alkylene glycol aryl ether, tripropylene glycol or dipropylene glycol, and an organic nitrogen compound of the formula:

wherein $R_1$, $R_2$ and $R_3$ are independently selected from the group consisting of hydrogen, alkanol and hydroxy ether groups, which groups contain from about 2 to 10 carbon atoms, at least one of $R_1$, $R_2$ and $R_3$ being other than hydrogen, the organic nitrogen compound having a boiling point of at least about 100 degrees C. and a molecular weight which is not substantially in excess of about 500. This composition, when admixed with water, has been found to form a particularly effective solution for removing natural and synthetic rubber latex materials from the glass walls of polymerization vessels.

More specifically, the alkaline concentrate composition of the present invention contains the alkaline material in an amount of at least about 50% by weight of the concentrate composition and preferably in an amount within the range of about 70 to 97% by weight of the concentrate composition. Desirably, this alkaline material is made up of one or more of alkali metal carbonates, alkali metal silicates, alkali metal phosphates, or the like. Exemplary of the alkali metal silicates and alkali metal phosphates which may be used are the alkali metal orthosilicates and meta silicates and the trialkali metal phosphates, alkali metal pyrophosphates, alkali metal tripolyphosphates, and the like. Additionally, in some instances, the alkaline portion of the concentrate composition may also contain alkali metal hydroxides. It is to be appreciated, however, that in choosing the alkaline material for the concentrate composition, the type and amount of these materials should be such that when the concentrate composition is dissolved in water in the amounts to form the desired aqueous stripping solution, the pH of the resulting solution is not in excess of about 12.

It is to be appreciated, of course, that as used in the specification and claims, the term "alkali metal" is intended to refer to lithium, sodium, potassium, cesium and rubidium. In many instances, the preferred alkali metal has been found to be sodium, so that primary reference hereinafter will be made to the compounds of sodium. This is not, however, to be taken as a limitation of the present invention but merely as being exemplary thereof, since other alkali metal compounds, such as potassium compounds and the like, are also useful.

In addition to the above-indicated alkaline materials, the concentrate composition of the present invention also includes an accelerating amount of an accelerator composition. Desirably, the accelerating composition is present in the concentrate in an amount within the range of about 2 to 50% by weight of the concentrate, with amounts within the range of about 12 to 25% by weight being preferred. The accelerating composition is comprised of an alkylene glycol aryl ether, tripropylene or dipropylene glycol, and an organic nitrogen containing compound. Desirably, the alkylene glycol aryl ether is present in the accelerator composition in an amount within the range of about 5 to 70% by weight, the tripropylene or dipropylene glycol is present in an amount within the range of about 5 to 70% by weight, and the organic nitrogen containing compound is present in an amount within the range of about 5 to 40% by weight of the accelerator composition. Preferably, the weight ratio of the alkylene glycol aryl ether to the tripropylene or dipropylene glycol to the organic nitrogen containing cmpound in the accelerator composition is within the range of about 1 to 4:1 to 4:1, with a particularly preferred ratio being 2:2:1.

The alkylene glycol aryl ethers used are of the type:

$$RO(R'O)_nH$$

wherein R is a monocyclic aryl radical, R' is an alkylene radical and $n$ has an average value of at least 1 and is preferably 1 to 2. Preferably, these ethers contain a total of at least seven carbon atoms and the alkylene radical preferably contains from about 2 to 6 carbon atoms. Various alkylene glycol aryl ethers of this type can be used in the accelerating composition of the present invention, including ethylene glycol monophenyl ether, propylene glycol monophenyl ether, butylene glycol monophenyl ether, diethylene glycol monophenyl ether, dipropylene glycol monophenyl ether, and the like. Of these, the preferred is ethylene glycol monophenyl ether, and for this reason, hereinafter primary reference will be made to this material.

The second component of the accelerator composition of the present invention is tripropylene glycol or dipropylene glycol. Of these materials, in many instances, the tripropylene glycol has been found to be preferred and for this reason, primary reference will be made hereinafter to this material.

The organic nitrogen compound component of the accelerating composition is a mono-, di-, or tri-alkanol or hydroxy ether amine, having the formula as has been set forth hereinabove. The compounds used have a boiling point of at least about 100 degrees C. and a molecular weight which is not substantially in excess of about 500. The alkanol and hydroxy ether groups which are substituents thereof each contain from about 2 to 10 carbon atoms, with from about 2 to 6 carbon atoms being preferred, wherein the hydroxy of the hydroxy ether group is terminal. Exemplary of specific organic nitrogen compounds which may be used are monoisopropyl amine; monoethanol amine; diethanolamine; triethanol amine; 2-amino-2-methyl-1-propanol; 2-amino-2-methyl - 1,3 - propane diol; 2 - amino - 2 - ethyl-1,3-propane diol; diglycol amine; trihexanol amine; dioctanol amine; monodecanol amine; tributanol amine; dipentanol amine; tri(2[hydroxyethoxy]ethyl) amine; 4[6 - hydroxyhexoxy]butylamine; 6[4-hydroxybutoxy]hexylamine; 5[2-hydroxyethoxy]pentylamine; 2-hydroxyethoxymethyl amine; di(3[2-hydroxyethoxy]propyl)amine; and the like. Of these, in many instances, the triethanol amine has been found to be preferred and for this reason hereinafter particular reference will be made to this material.

In addition to the components indicated hereinabove, the concentrate composition of the present invention may also include a gluconic acid material. Such material is typically present in the composition in amounts up to about 10% by weight of the concentrate, with amounts within the range of about 2 to 7% by weight of the concentrate composition being preferred. It is to be understood that by the term "gluconic acid material" it is intended to refer to and include gluconic acid itself, water soluble and/or water dispersible forms of gluconic acid such as the alkali metal gluconates, and in particular, sodium gluconate, glucono-delta-lactone, and the like.

Surface active or wetting agents may also be included in the composition, in amounts up to about 10% by weight of the concentrate, with amounts within the range of about 0.1 to 7% by weight of the concentrate being preferred. Various suitable active agents of the anionic, nonionic, and cationic types may be used, provided they are soluble and effective in the alkaline stripping solution. In many instances, excellent results have been obtained when using wetting or surface active agents of the phosphate ester type and, accordingly, these materials are preferred. Additionally, sulfated fatty acid derivatives and sulfated fatty acid amide derivatives, as described in U.S. Pats. 2,528,378 and 2,773,068, as well as sulfated alcohols, such as the sodium sulfate derivatives of 2-ethylhexanol, may also be used.

Other adjuvants which may be incorporated in the concentrate composition includes rinsing or dispersing agents, such as lignin sulfonates, as well as materials to impart a pleasant odor to this composition, such as pine oil, and the like. Typically, these materials are present in the concentrate compositions in amounts up to about 10% by weight of the composition.

In formulating aqueous alkaline stripping compositions, the alkaline concentrate composition as heretofore been described is admixed with water in an amount sufficient to provide a stripping composition having the desired alkalinity to effect substantial loosening of the natural or synthetic rubber latex material to which the stripping composition is applied. Desirably, the alkalinity of the stripping solution is not in excess of a pH of about 12, with pH values within the range of about 10 to 12 being preferred, when the alkaline concentrate is used to remove latex residue from the interior of glass lined equipment. Higher pH values are acceptable when cleaning mild steel or stainless steel equipment, however. Typically, the aqueous alkaline stripping compositions will contain the concentrate composition in an amount within the range of about 0.25 to 5 pounds per gallon of solution, with amounts within the range of about 0.5 to 2 pounds per gallon being preferred.

It is to be appreciated, that if desired, the accelerating composition and the alkaline portion of the composition may be admixed separately with the water, rather than being added as a single composition. Where this is done, the alkaline portion of the concentrate composition is desirably mixed with water in an amount within the range of about 0.25 to 5 pounds per gallon, while the accelerator composition is added in an amount within the range of about 0.5 to 20% by volume of the aqueous stripping composition. In a most preferred embodiment of the invention, the aqueous alkaline stripping solution will contain the alkaline components of the concentrate material in an amount within the range of about 0.5 to 2 pounds per gallon and the accelerator composition in an amount within the range of about 2 to 10% by volume of the stripping solution, the accelerating composition having a weight ratio of ethyleneglycol monophenyl ether to tripropylene glycol to triethanolamine of about 2:2:1.

In utilizing the stripping compositions of the present invention, the thus-formulated aqueous alkaline stripping solution is brought into contact with the substrate, such as the glass walls of a polymerizer, from which the latex material is to be removed. The contact time required to effect a substantial loosening of the latex material will, of course, depend upon the nature and thickness of the latex coating which is to be removed. In some instances, contact times of about 20 to 30 minutes may be sufficient while in other instances, contact times of 40 minutes or more may be desirable. Accordingly, it is not possible to give specific contact times which are used since in each instance, the contact time utilized will be that which will effect substantial loosening of the latex material.

In this respect, it is to be noted that it is not essential that the stripping solution of the present invention remain in contact with the latex coated substrates for a period sufficient to effect complete removal of the coating from the substrate. It is only necessary that the contact times be sufficient to effect a loosening of the latex coating so that it may then be removed by brushing, high pressure water sprays, or the like.

This composition was dissolved in water in an amount of one pound per gallon and various accelerator compounds or compositions were incorporated in the alkaline solution, in an amount of about 6% by volume of the solution. The coated glass lined pipe was immersed in this solution and retained there until there was a substantially complete removal of the latex material from the pipe, the stripping solution being maintained at a temerature of about 100 degrees C. Using this procedure, the following results were obtained, wherein for convenience, the ethylene glycol monophenyl ether is referred to as "EP"; the tripropylene glycol is referred to as "TPG"; and the dipropylene glycol in referred to as "DPG";

| Example | Accelerator | Weight ratio of accelerator compounds | Stripping time, minutes | Latex film appearance |
|---|---|---|---|---|
| 1 | | | (1) | |
| 2 | TPG plus triethanolamine | 3:2 | 90 | Dry flexible film. |
| 3 | EP plus triethanolamine | 3:1 | 30 | Gummy sticky mass. |
| 4 | EP plus TPG | 1:2 | 60 | Dry flexible film. |
| 5 | EP plus TPG plus triethanolamine | 2:2:1 | 30 | Do. |
| 6 | EP plus DPG plus triethanolamine | 2:2:1 | 40 | Do. |

1 No effect in 120 minutes.

Generally, it is desirable that the contact between the stripping solution and the substrate from which the latex material is to be removed is effected in a manner such that a thorough and continuous wetting of the substrate by the stripping solution is obtained. This may be done by immersing the substrate in the solution or, in the case of glass lined polymerization vessels, by filling the vessels with the solution. In other instances, however, other contacting techniques such as spraying, flooding, or the like, may also be used.

Desirably, the stripping solution is at an elevated temperature when it is brought into contact with the substrate. Preferably the solution is at a temperature which is close to its boiling point, with temperatures within the range of about 90 to 100 degrees centigrade being typical. It will be appreciated, however, that in many instances higher or lower temperatures, e.g. room temperature, may also be used.

It has been found that by using the aqueous alkaline stripping solution described above in the manner which has been indicated, there is obtained an appreciable reduction in the time required to effect a substantial loosening of natural or synthetic rubber latex compositions from various substrates such as glass lined walls of polymerization vessels. Moreover, it has been found that after removal, the latex material is in the form of an easily handleable, dry, flexible film, rather than a gummy, sticky mass.

In order that those skilled in the art may better understand the present invention and the manner in which it may be practiced, the following specific examples are given. It is to be understood, however, that these examples are merely exemplary of the compositions and processes of the present invention and are not to be taken as a limitation thereof. In these examples unless otherwise indicated, temperatures are in degrees centigrade and parts and percents are by weight.

In the following examples, a rubber latex was applied, one coat at a time, to a section of glass-lined pipe, to a thickness of 100 mils, with the coating being given a mild bake after the application of each coat. An alkaline composition was formulated by admixing the following components in the amounts indicated:

| Component: | Percent by wt. |
|---|---|
| $Na_2SiO_3 \cdot 5H_2O$ | 60 |
| $Na_2CO_3$ | 18 |
| Tetrasodium pyrophosphate | 20 |
| Wetting agent | 2 |

While there have been described various embodiments of the invention, the compositions and methods described are not intended to be understood as limiting the scope of the invention as changes therein are possible and it is intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. An aqueous composition useful in removing natural and synthetic rubber latex materials from a substrate which consists essentially of an aqueous solution of a concentrate which consists essentially of from about 2 to 50% by weight of an accelerator composition which consists essentially of tripropylene or dipropylene glycol, and alkylene glycol aryl ether having the formula $$RO(R'O)_nH$$

wherein R is a phenyl radical, R' is an alkylene radical containing from about 2 to 7 carbon atoms and n has an average value of at least 1 and triethanolamine, the weight ratio of the glycol ether, glycol, and triethanolamine being within the range of about 1–4:1–4:1, and from about 50 to 98% by weight of an alkaline material selected from alkali metal hydroxides, alkali metal silicates, alkali metal phosphates and alkali metal carbonates, which concentrate composition is present in an amount of about 0.25 to 5 lbs. per gallon of the aqueous composition.

2. The aqueous composition as claimed in claim 1 wherein two of the components of the accelerator composition are ethylene glycolmonophenyl ether and tripropylene glycol.

3. A method of removing natural snythetic rubber latex materials from a substrate which comprises contacting the substrate from which the latex is to be removed with the aqueous composition as claimed in claim 1 and maintaining the composition in contact with the substrate for a period sufficient to effect a substantial loosening of the latex material.

4. A method of removing natural and synthetic rubber latex materials from the substrate which comprises contacting the substrate from which the latex is to be removed with the aqueous composition as claimed in claim 2 and maintaining the composition in contact with the substrate for a period sufficient to effect a substantial loosening of the latex.

(References on following page)

References Cited

UNITED STATES PATENTS

| | | | |
|---|---|---|---|
| 1,829,583 | 6/1931 | Davidson | 252—153 |
| 2,433,517 | 12/1947 | Kuentzel | 252—154 |
| 2,710,843 | 6/1955 | Stebleton | 134—29 X |
| 2,750,343 | 6/1956 | Beber | 252—153 |
| 2,897,104 | 7/1959 | Duncan | 134—38 X |
| 2,971,919 | 2/1961 | Goldsmith | 252—139 |
| 3,179,609 | 4/1965 | Morison | 260—28 |
| 3,308,066 | 3/1967 | Murphy et al. | 252—156 X |
| 3,553,144 | 1/1971 | Murphy | 252—158 |

JOHN D. WELSH, Primary Examiner

A. I. RADY, Assistant Examiner

U.S. Cl. X.R.

134—38; 252—548, 158